United States Patent
Mancini et al.

(10) Patent No.: US 11,938,556 B2
(45) Date of Patent: *Mar. 26, 2024

(54) ULTRASONIC WELDING SYSTEM WITH A POSITIVE LOCKING CONNECTION

(71) Applicant: Herrmann Ultraschalltechnik Gmbh & Co. KG, Karlsbad (DE)

(72) Inventors: Raffaele Mancini, Karlsruhe (DE); Johannes Pohl, Ettlingen (DE); Ulrich Vogler, Uhldingen-Muhlhofen (DE); Stefan Zendler, Straubenhardt (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 179 days.

This patent is subject to a terminal disclaimer.

(21) Appl. No.: 17/414,435

(22) PCT Filed: Dec. 12, 2019

(86) PCT No.: PCT/EP2019/084922
§ 371 (c)(1),
(2) Date: Jun. 16, 2021

(87) PCT Pub. No.: WO2020/126831
PCT Pub. Date: Jun. 25, 2020

(65) Prior Publication Data
US 2022/0088700 A1  Mar. 24, 2022

(30) Foreign Application Priority Data
Dec. 19, 2018 (DE) ............... 10 2018 132 837.0

(51) Int. Cl.
*B23K 20/10* (2006.01)
*B06B 3/00* (2006.01)

(52) U.S. Cl.
CPC .............. *B23K 20/106* (2013.01); *B06B 3/00* (2013.01); *B06B 2201/72* (2013.01)

(58) Field of Classification Search
CPC ..... B23K 20/106; B06B 3/00; B06B 2201/72; B29C 65/081
See application file for complete search history.

(56) References Cited

U.S. PATENT DOCUMENTS 2,369,273 A * 2/1945 Bakewell ................. B23G 5/20
408/233
4,646,957 A 3/1987 Nuss
(Continued)

FOREIGN PATENT DOCUMENTS

CN 101883656 A 11/2010
CN 102026796 A 4/2011
(Continued)

OTHER PUBLICATIONS

Office Action, dated Jul. 26, 2022, Chinese Patent Application No. 2019/ 80080 1068.
(Continued)

*Primary Examiner* — Erin B Saad
*Assistant Examiner* — Carlos J Gamino
(74) *Attorney, Agent, or Firm* — PAUL & PAUL

(57) ABSTRACT

The present invention concerns an ultrasonic welding installation comprising an ultrasonic vibration unit having a sonotrode and a converter, wherein the sonotrode and the converter are arranged in mutually adjacent relationship along a longitudinal axis and the ultrasonic vibration unit can be caused to resonate with an ultrasonic vibration in the direction of the longitudinal axis with a wavelength λ/2, wherein there is provided a holder for holding the ultrasonic vibration unit. To provide an ultrasonic welding installation which allows simple and quick highly precise adjustment of
(Continued)

Figure 1:
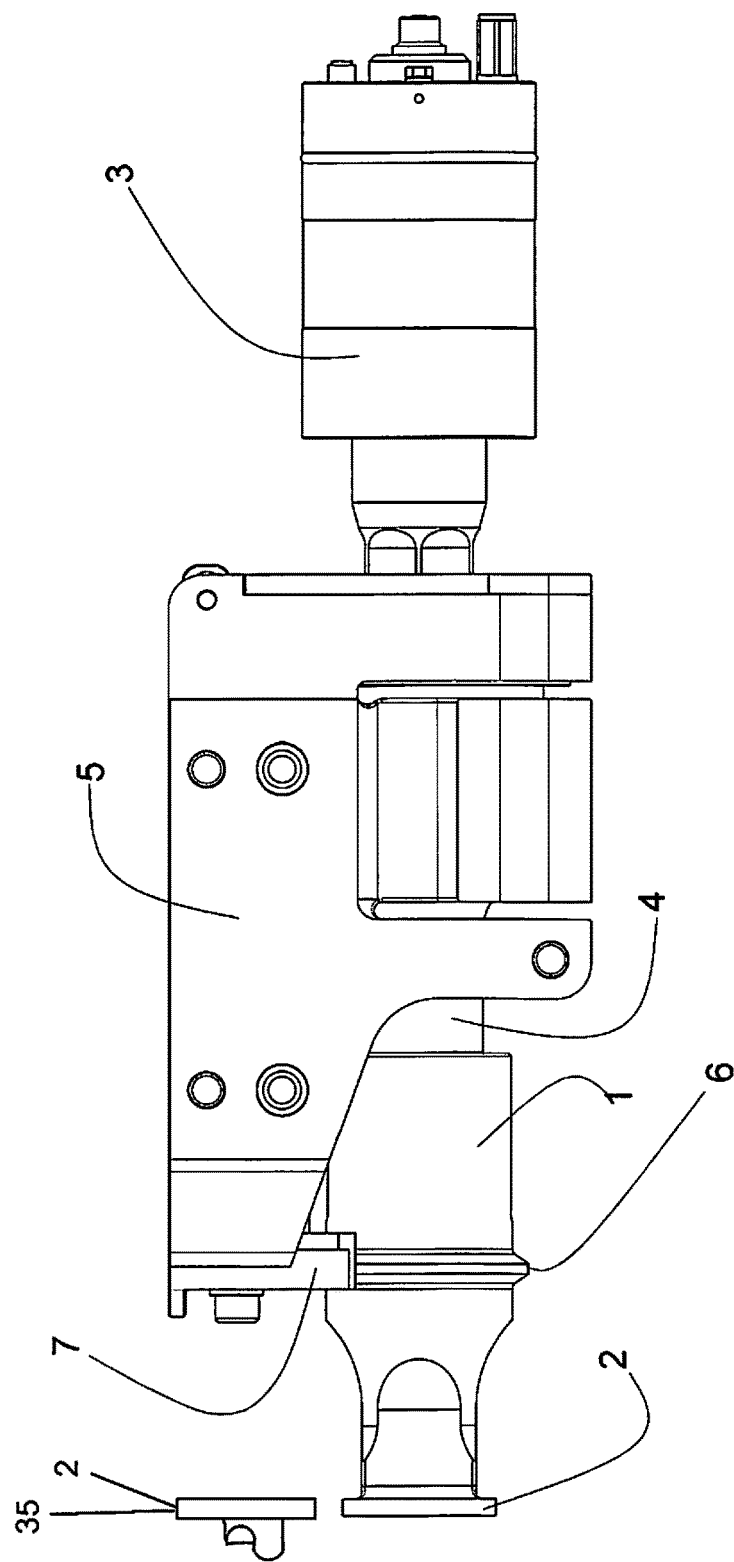

the sealing surfaces of the sonotrode relative to the anvil it is proposed according to the invention that the holder has an angle positioning device, wherein the angle positioning device and the ultrasonic vibration unit are of such a configuration that they can be connected together in positively locking relationship so that a rotation of the ultrasonic vibration unit about the longitudinal axis is prevented by the positively locking connection and a relative movement between the ultrasonic vibration unit and the holder in the direction of the longitudinal axis is not prevented.

18 Claims, 8 Drawing Sheets

(56) References Cited

U.S. PATENT DOCUMENTS

| | | | |
|---|---|---|---|
| 4,751,916 A | 6/1988 | Bory | |
| 5,362,172 A * | 11/1994 | Hubbling | G11B 23/0316 403/345 |
| 5,617,602 A * | 4/1997 | Okada | A61C 17/222 403/333 |
| 5,931,367 A | 8/1999 | Sato et al. | |
| 6,019,574 A * | 2/2000 | DiBella | F04D 29/563 415/148 |
| 6,146,060 A * | 11/2000 | Rydberg | B23C 5/1054 407/103 |
| 6,193,430 B1 * | 2/2001 | Culpepper | B23P 19/10 403/14 |
| 6,623,202 B2 * | 9/2003 | Hansson | B23B 31/11 464/182 |
| 6,699,010 B2 * | 3/2004 | Jinnai | F16D 1/06 29/889.22 |
| 7,490,533 B2 * | 2/2009 | Dehn | B23G 5/06 407/103 |
| 8,147,187 B2 * | 4/2012 | Foucher | F04D 29/563 415/163 |
| 8,312,637 B2 | 11/2012 | Scheuerman et al. | |
| 8,573,901 B2 * | 11/2013 | de Souza Filho | B23B 31/4006 407/42 |
| 9,016,549 B2 | 4/2015 | Storm et al. | |
| 9,089,911 B2 * | 7/2015 | Espinosa | B23C 5/26 |
| 9,248,520 B2 * | 2/2016 | Lang | B23K 20/106 |
| 9,358,633 B2 | 6/2016 | Stroh et al. | |
| 10,307,968 B2 | 6/2019 | Tamamoto et al. | |
| 10,751,814 B2 * | 8/2020 | Kemmler | B23C 5/10 |
| 11,090,759 B2 * | 8/2021 | Vogler | B06B 1/0207 |
| 11,255,217 B2 * | 2/2022 | Landry | F01D 17/162 |
| 2004/0065415 A1 | 4/2004 | Sato et al. | |
| 2006/0051167 A1 * | 3/2006 | Massa | B23B 27/164 407/103 |
| 2006/0231585 A1 * | 10/2006 | Dieterle | H01R 43/0207 228/101 |
| 2007/0081873 A1 * | 4/2007 | Blomstedt | B23C 5/10 409/234 |
| 2008/0247832 A1 * | 10/2008 | Maier | B23B 31/1122 408/239 R |
| 2009/0283570 A1 | 11/2009 | Gerdes et al. | |
| 2010/0206487 A1 | 8/2010 | Arai et al. | |
| 2011/0036897 A1 | 2/2011 | Nakai | |
| 2018/0347651 A1 * | 12/2018 | Hacklberger | F16D 55/227 |

FOREIGN PATENT DOCUMENTS

| | | |
|---|---|---|
| CN | 105030320 A | 11/2015 |
| DE | 3508122 A1 | 9/1986 |
| DE | 3606305 A1 | 9/1986 |
| DE | 69515921 T2 | 10/2000 |
| DE | 102004022313 B3 | 10/2005 |
| DE | 102005005480 B3 | 4/2006 |
| DE | 102010049571 A1 | 6/2011 |
| DE | 102011104226 A1 | 12/2011 |
| DE | 102013103887 A1 | 10/2014 |
| DE | 102015110576 A1 | 1/2017 |
| DE | 112016003596 B4 | 3/2021 |
| EP | 0667189 B1 | 3/2000 |
| EP | 2267765 A1 | 12/2010 |
| JP | 2012161767 A | 8/2012 |
| JP | 2015123481 A | 7/2015 |

OTHER PUBLICATIONS

Japanese Patent Office, Office Action, Appln. No. 2021-535123, dated Aug. 23, 2022 (English translation).
China National Intellectual Property Administration, First Office Action, daed Dec. 29, 2021, Chinese Application No. 201980080106.8, (and English Translation).
Nora Lindner/Martin Gassmann, The International Bureau of the World Intellectual Property Organization, International Preliminary Report on Patentability, PCT/EP2019/084922, Date of Mailing of Report: Jun. 24, 2021 (English translation).

* cited by examiner

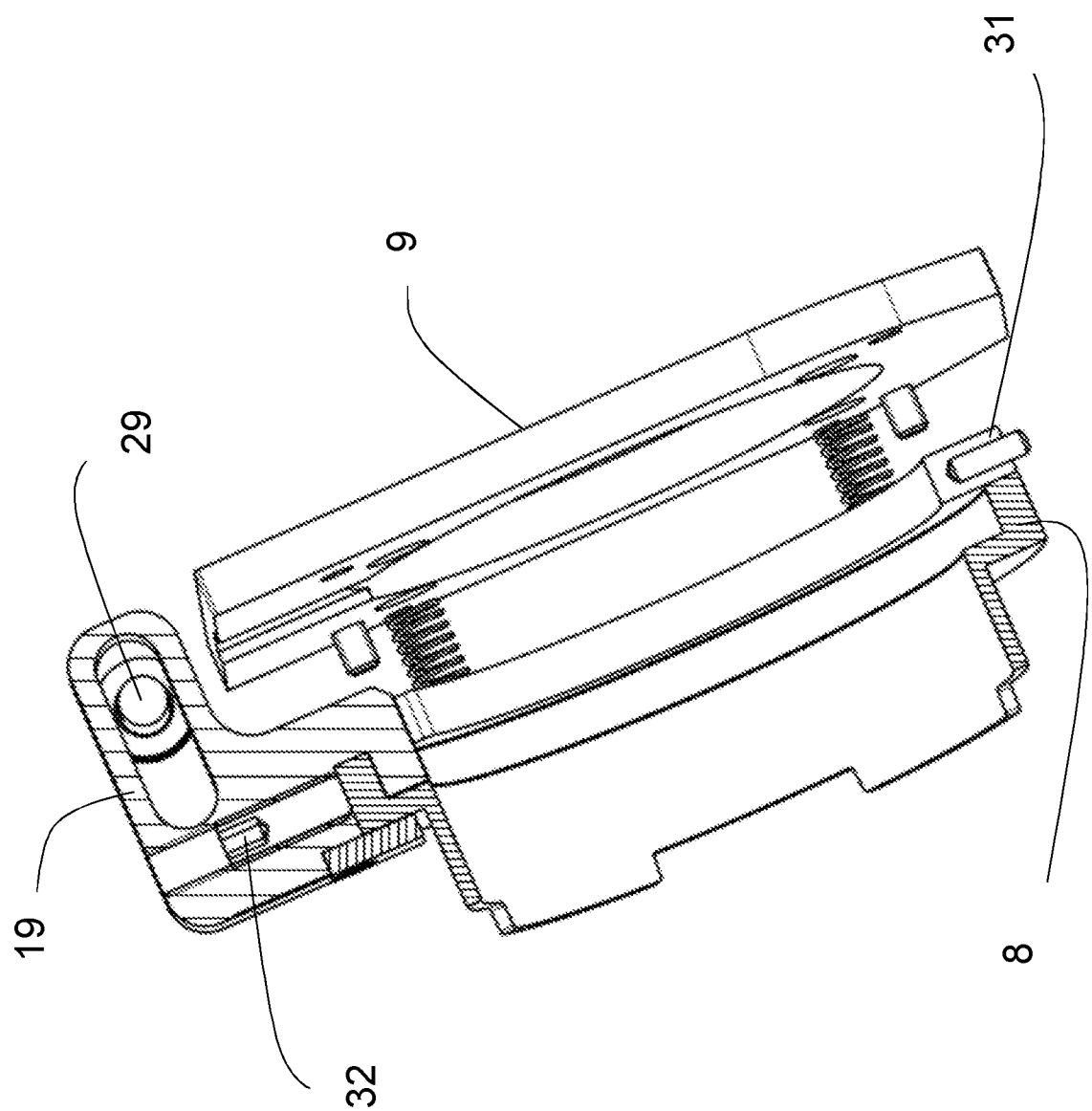

ULTRASONIC WELDING SYSTEM WITH A POSITIVE LOCKING CONNECTION

CROSS-REFERENCE TO RELATED APPLICATIONS

This application is a national phase of International Application PCT/EP2019/084922 filed Dec. 12, 2019, and claims the priority of German Application No. 10 2018 132 837.0, filed on Dec. 19, 2018.

The present invention concerns an ultrasonic welding installation comprising an ultrasonic vibration unit having a sonotrode and a converter. The sonotrode and the converter are arranged in mutually adjacent relationship along a longitudinal axis and are matched to each other in such a way that the ultrasonic vibration unit can be caused to resonate with an ultrasonic vibration in the direction of the longitudinal axis at a frequency $f=v/\lambda$, wherein v is the propagation direction of the acoustic ultrasonic vibration within the ultrasonic vibration unit and $\lambda$ is the wavelength of the ultrasonic vibration. In that case formed in the ultrasonic vibration unit is a standing wave with vibration nodes and vibration maxima. In the simplest case the sonotrode has precisely one vibration node and two vibration maxima, that is to say the sonotrode is of a length corresponding to half the wavelength $\lambda/2$ of the resonance vibration.

In general the ultrasonic welding installation has an anvil, wherein the material to be processed is arranged between the sealing surface of the sonotrode and the sealing surface of the anvil.

The ultrasonic vibration unit has to be held for the processing operation and therefore has a suitable holder.

EP 2 267 765 A1 discloses for example a support device for a resonator which can support the resonator at any location, allows the resonator to vibrate consistently with a given vibration and can efficiently transmit an ultrasonic vibration to objects.

Further holding structures for ultrasonic welding apparatuses are also described for example in DE 11 2016 003 596 T5 and DE 10 2013 103 887 A1.

The demands on the welding quality are always increasing more and more. In addition there are materials like for example metal, upon the welding processing of which considerable wear occurs at the sealing surfaces of the sonotrode whereby it is necessary for the sonotrode to be frequently replaced. Occasionally turning sonotrodes having a plurality of sealing surfaces have already been proposed, in which the sonotrode can be turned after a sealing surface has suffered wear in order to continue operating with another sealing surface.

In order to achieve a high weld quality in particular in metal welding it is necessary for the sealing surfaces of the sonotrode and the anvil to be positioned very precisely parallel to each other. In particular parallel positioning of the ultrasonic vibration unit and the sealing surface of the sonotrode relative to the anvil is highly complicated and laborious in the known ultrasonic welding installations and frequently can only be carried out by especially trained operatives which leads to troublesome interruptions in the processing procedure, in particular when the sonotrode has to be frequently replaced. The use of turning sonotrodes does not in any way change that as, after each turn of the sonotrode, it has to be again positioned precisely parallel to the anvil.

Therefore the object of the present invention is to provide an ultrasonic welding installation which allows simple quick highly precise adjustment of the sealing surfaces of the sonotrode relative to the anvil.

According to the invention that object is attained in that the holder has an angle positioning device, wherein the angle positioning device and the ultrasonic vibration unit are of such a configuration that they can be connected together in positively locking relationship so that a rotation of the ultrasonic vibration unit about the longitudinal axis is prevented by the positively locking connection and a relative movement between the ultrasonic vibration unit and the holder in the direction of the longitudinal axis is not prevented.

By virtue of that positively locking connection the angular position of the ultrasonic vibration unit is established in relation to the longitudinal axis thereof. The ultrasonic vibration unit only has to be connected to the angle positioning device to fix the rotary position. Accordingly positioning of the ultrasonic vibration unit can be effected at least to a limited extent in the direction of the longitudinal axis. Further rotation about the longitudinal axis is prevented by the positively locking connection. The positively locking connection is of such a configuration in that case that the angular position is in the desired position in relation to the longitudinal axis when the positively locking connection comes into effect. Further adjustment in the rotary direction is not necessary. The ultrasonic vibration unit therefore only has to be connected to the angle positioning device to achieve almost perfectly parallel orientation of the sealing surfaces of anvil and sonotrode.

In a preferred embodiment the ultrasonic vibration unit has an outer bead with at least one recess, wherein the angle positioning device has at least one projection which corresponds to the recess and which can engage into the recess and thus provide the positively locking connection.

In that respect the outer bead has a plurality of recesses, wherein preferably the angle positioning device has a plurality of projections corresponding to the plurality of recesses, wherein particularly preferably the ultrasonic vibration unit can be connected in positively locking relationship to the angle positioning device in a plurality of positions rotated relative to each other about the longitudinal axis.

Particularly when the sonotrode is in the form of a turning sonotrode having a plurality of sealing surfaces the latter embodiment is of advantage. In any position in which the positively locking connection prevents relative rotation between the angle positioning device and the ultrasonic vibration unit the ultrasonic vibration unit is in a rotary position in which one of the plurality of sealing surfaces is oriented in the optimum fashion.

The outer bead can be of any desired configuration. For example the outer bead can have a T-shaped cross-section. The outer bead then has a leg and a flange extending on both sides at a right angle from one side of the leg. The recess or recesses can then preferably be provided in the flange.

The at least one projection of the angle positioning device can in principle extend in any direction insofar as it is capable of providing a positively locking connection to the ultrasonic vibration unit. In a preferred embodiment the projection of the angle positioning device extends in the axial direction.

In a further preferred embodiment the at least one recess of the outer bead and the projection of the angle positioning device have mutually corresponding contact surfaces which when the ultrasonic vibration unit is fitted into the angle positioning device come into contact with each other upon rotation of the ultrasonic vibration unit about the longitudinal axis, wherein preferably the contact surfaces of the recess and/or the projection are inclined relative to the longitudinal axis. Basically this embodiment represents a tooth configuration between the angle positioning device on the one hand and the ultrasonic vibration unit on the other hand.

To make the positively locking connection as play-free as possible a preferred embodiment provides that the projections and/or recesses are of a configuration converging to a point, with the result that the contact surfaces are inclined with respect to the longitudinal axis. For example the projections and recesses can be in the form of a Hirth serration.

In a further preferred embodiment the angle positioning device has a fixing element for fixing the angle positioning device to a machine stand and has a coupling element which is reciprocable between two positions in the direction of the longitudinal axis relative to the fixing element, wherein the positively locking connection between the coupling element and the ultrasonic vibration unit can be produced. In that case the coupling element can be elastically pre-stressed into one of the positions.

By virtue of the two-part nature of the angle positioning device the coupling element can involve a positively locking connection with the ultrasonic vibration unit or can be taken out of engagement therewith to permit rotation of the ultrasonic vibration unit about its longitudinal axis.

In a further preferred embodiment a pressure plate is provided between the fixing element and the coupling element, the coupling element being rotatable about the longitudinal axis relative to the pressure plate. In addition there is provided an arresting device with which the coupling element can be arrested in such a way that rotation of the coupling element about the longitudinal axis of the ultrasonic vibration unit is prevented. In a preferred embodiment the arresting device is fixed to the holder.

There can be provided a fine adjustment device with which the coupling element can be rotated to and fro between two rotary positions relative to the fixing element about the longitudinal axis, wherein particularly preferably the fine adjustment device comprises an adjusting element with slot which can be connected to the coupling element and a screw which engages through the slot and engages into a threaded bore in the holder.

The rotatability of the coupling element relative to the fixing element serves to compensate for any deviations which possibly still exist from parallelism of the sealing surface of the sonotrode and the sealing surface of the anvil. That can be effected extremely precisely by means of the fine adjustment device.

In a further preferred embodiment the outer bead is arranged on the sonotrode or an amplitude transformer arranged between the sonotrode and the converter, wherein preferably the bead is arranged in a vibration node of the resonance vibration of the wavelength λ/2. The arrangement at the vibration node ensures that the influence on the resonance vibration by the holder or the angle positioning device is minimal. If the outer bead is of a T-shaped cross-section with a leg and a flange extending at both sides at a right angle from a side of the leg then the leg should be arranged at the vibration node of the resonance vibration.

In a further preferred embodiment there is provided a support element for supporting a force applied to the sonotrode perpendicularly to the longitudinal axis, wherein the sonotrode and the support element have mutually corresponding support surfaces which at least when a force is applied to the sonotrode perpendicularly to the longitudinal axis come into contact with each other, wherein the support surfaces are of such a configuration that when they are in contact with each other they prevent a relative movement of the sonotrode with respect to the support element in the direction of the longitudinal axis and do not impede a rotation of the sonotrode about the longitudinal axis.

This embodiment is advantageous in particular when the outer bead for the angle positioning device is arranged on the amplitude transformer as then the force exerted on the sonotrode during the welding operation has a great lever action which can be carried by means of the support element. Even if the sealing surfaces of sonotrode and anvil are oriented exactly parallel to each other that changes if the sonotrode is loaded with a flexural moment transversely to the longitudinal axis. That is the case whenever the sealing surface of the sonotrode is not positioned perpendicularly to the longitudinal axis. Particularly in metal welding the sealing surface of the sonotrode is generally oriented in such a way that a normal to the sealing surface includes a right angle with the longitudinal axis. As in metal welding relatively high forces also have to be applied flexing of the ultrasonic vibration unit occurs, with the result that the sealing surface of the sonotrode is no longer oriented exactly parallel to the sealing surface of the anvil whereby the welding quality is reduced. In addition the components of the ultrasonic vibration unit can also be damaged by high flexural moments, and that is to be avoided. Flexing and therewith a deviation from parallelism is reduced by the support element and damage to components of the holder or the ultrasonic vibration unit is avoided.

By way of example the sonotrode can have a rib and the support element can have a groove which engage into each other to given the support action. Alternatively the sonotrode can also have the groove and the support element the rib. The rib and groove then have corresponding support surfaces. Preferably the rib or the groove of the sonotrode is arranged at a vibration node of the resonance vibration.

In a preferred embodiment the corresponding support surfaces are inclined with respect to a plane perpendicular to the longitudinal axis. In a particularly preferred embodiment both the groove and also the rib are of a trapezoidal cross-section. That measure provides that axial positioning of the ultrasonic vibration unit is very simple and precise.

In a further preferred embodiment there is a counterpart tool, wherein the sonotrode and the counterpart tool are movable relative to each other in a direction perpendicular to the longitudinal axis and the support element is so positioned that a force exerted on the sonotrode by the counterpart tool possibly by way of a material between the sonotrode and the counterpart tool is transmitted to the support element. Basically therefore the counterpart tool and the support element are positioned on opposite sides of the sonotrode.

In a further embodiment the support element is fixed to the holder, wherein preferably the support element can be reciprocated relative to the holder between a holding position and a release position. In the holding position the corresponding contact surfaces 38, 39 are in contact with each other. While in the release position the ultrasonic vibration unit can be moved in the direction of the longitudinal axis without that movement being impeded by the support element. In a particularly preferred embodiment there is provided a locking device which can lock the support element in the holding position.

In a further preferred embodiment an amplitude transformer is provided between the sonotrode and the converter, wherein the amplitude transformer is connected to the converter and/or the sonotrode by way of a positively locking connection which provides a positively locking relationship in all directions of the planes perpendicular to the longitudinal axis. By way of example the positively locking connection between the amplitude transformer and the converter or between the amplitude transformer and the sonotrode can comprise a pin and a corresponding opening, wherein preferably the pin is arranged on the amplitude transformer and the corresponding opening on the sonotrode or the converter.

The pin and the corresponding opening are preferably not of a rotationally symmetrical configuration relative to the longitudinal axis so that rotational positioning of the sonotrode with respect to the amplitude transformer or the converter with respect to the amplitude transformer is effected by the positively locking connection. Alternatively there can also be provided a plurality of pins and openings corresponding thereto. In that case the pin or pins should be of such a configuration that the amplitude transformer can be brought into engagement with the sonotrode or the converter only in defined rotary angle positions.

In that respect in a particularly preferred embodiment the pin and the corresponding opening have a rotational symmetry about the longitudinal axis with a n-fold axis of rotation. If the sonotrode is in the form of a turning sonotrode rotationally symmetrically about the longitudinal axis with a m-fold axis of rotation then preferably m=n. In other words the amplitude transformer can be brought into engagement with the sonotrode or the converter only in n defined rotary angle positions.

The positively locking connection generally allows axial mobility between the amplitude transformer on the one hand and the sonotrode or converter on the other hand. To fixedly connect the elements together for example the amplitude transformer can have a threaded bore and the sonotrode or the converter can have a stepped through bore so that axial fixing can be effected with a screw which passes through the through bore and engages into the threaded bore.

Alternatively the opening could also be shrunk on to the pin.

In a further preferred embodiment it is provided that the pin and the corresponding opening are conical or have a conical portion. The conical shape serves on the one hand for centering the connection between the sonotrode and the amplitude transformer or the connection between the amplitude transformer and the converter. On the other hand the connection can be of a self-locking nature by virtue of the conical shape. A cone angle of a maximum of 2° is therefore advantageous.

In a further preferred embodiment there is provided a holder having a clamping device which can be reciprocated between an opened position and a closed position. In that case the ultrasonic vibration unit in the opened position can be removed from the holder. In the closed position the clamping device is in contact with the ultrasonic vibration unit at at least two holding points (41) and exerts a force thereon so that the ultrasonic vibration unit is held.

In that respect the holding points are preferably arranged on the outer bead.

In a particularly preferred embodiment the clamping device is in the form of a tightening sleeve with slot. In that arrangement the tightening sleeve has an inner surface corresponding to the outer surface of a portion of the ultrasonic vibration unit. The slot connects the outer surface of the sleeve to the inner surface of the sleeve so that the sleeve has two mutually opposite slot walls which delimit the slot. There is provided a tightening device with which the slot walls can be moved towards each other whereby the space enclosed by the inner surface is reduced and the ultrasonic vibration unit is clamped within the sleeve.

By way of example a threaded bore can be provided in one slot wall and a stepped through bore can be provided in the other slot wall so that a screw serving as the tightening device can engage through the stepped through bore into the threaded bore and upon rotation of the screw the two slot walls can be moved towards each other.

To prevent damage to the ultrasonic vibration unit by the clamping device a preferred embodiment provides that the slot walls serve as abutment surfaces. Therefore a portion of the outer surface of the ultrasonic vibration unit and the inner surface of the tightening sleeve are so matched to each other that, when the slot walls are in contact, the ultrasonic vibration unit is securely held by the clamping device without damage to the ultrasonic vibration unit.

Figure 2:
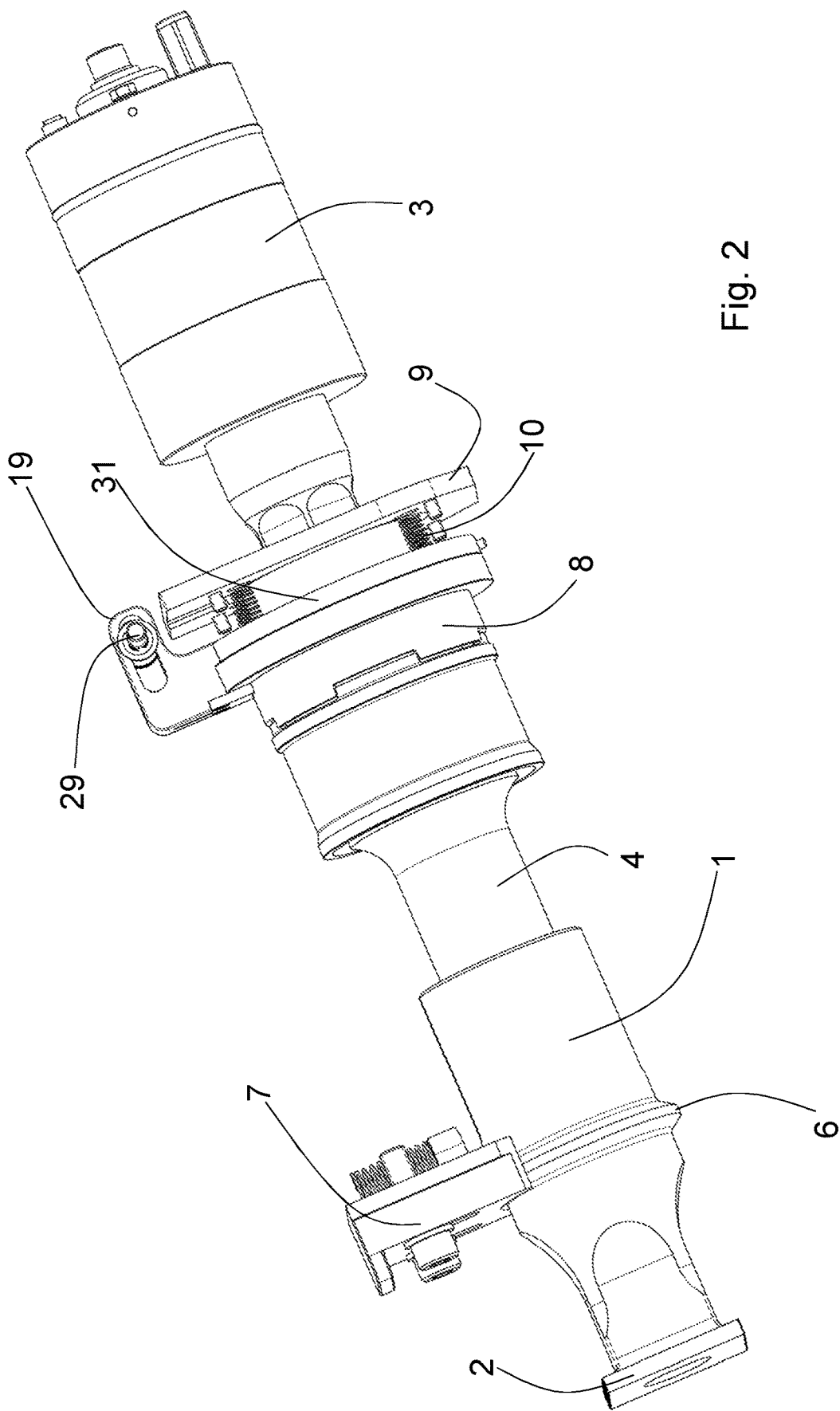
Figure 3:
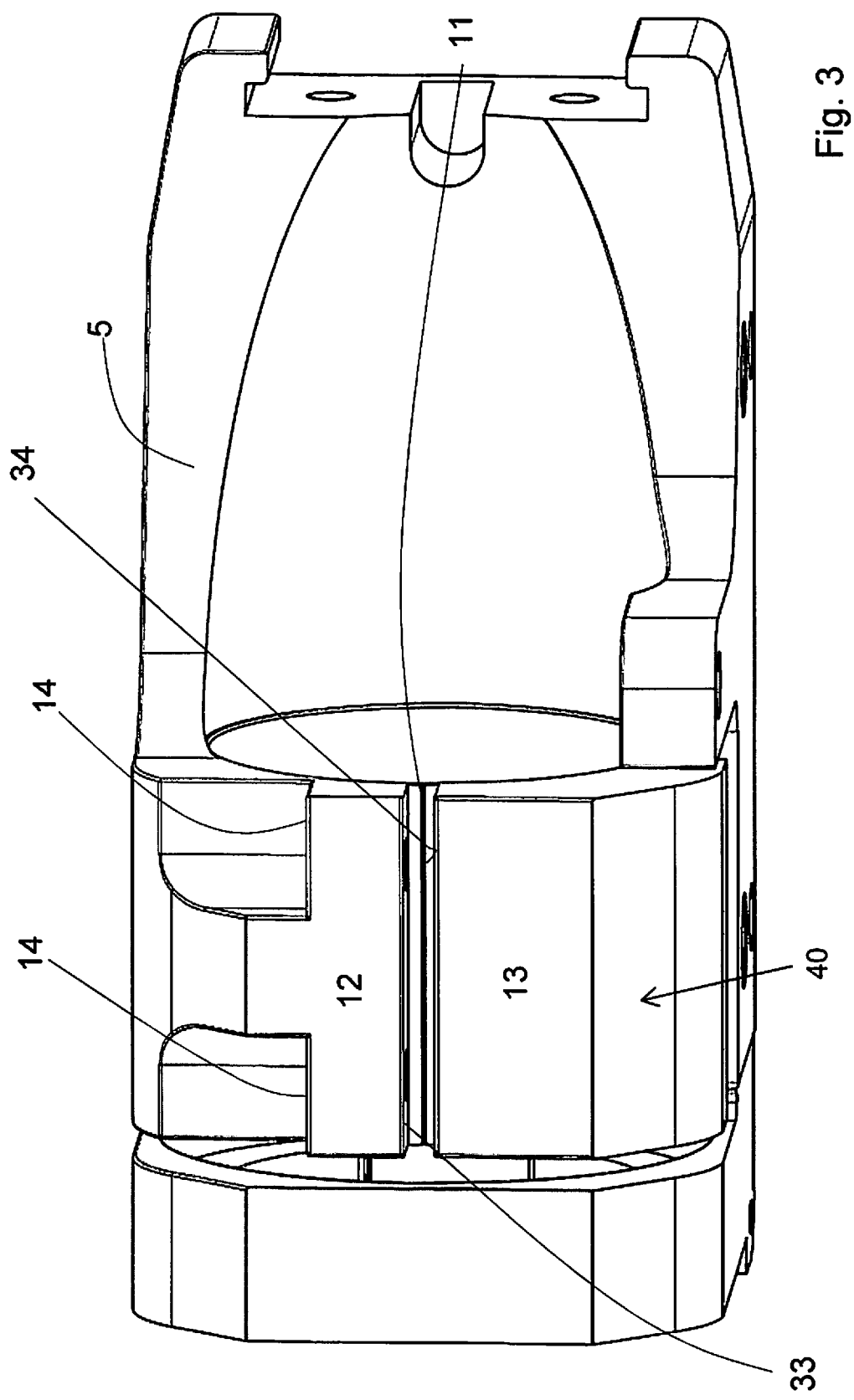
Figure 4A:
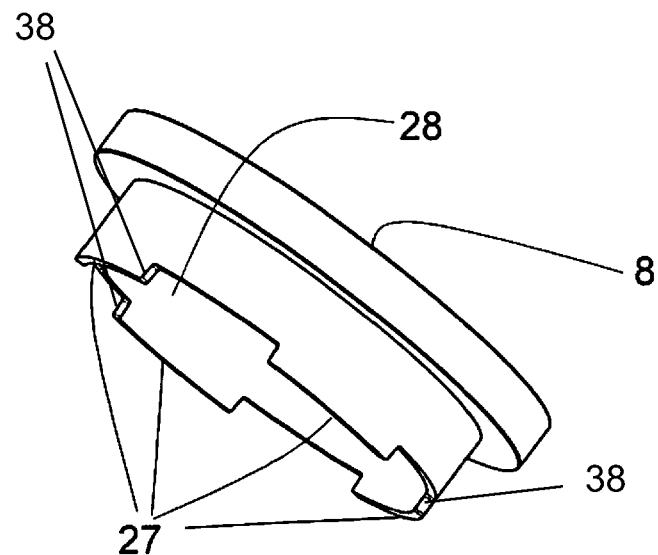
Figure 4B:
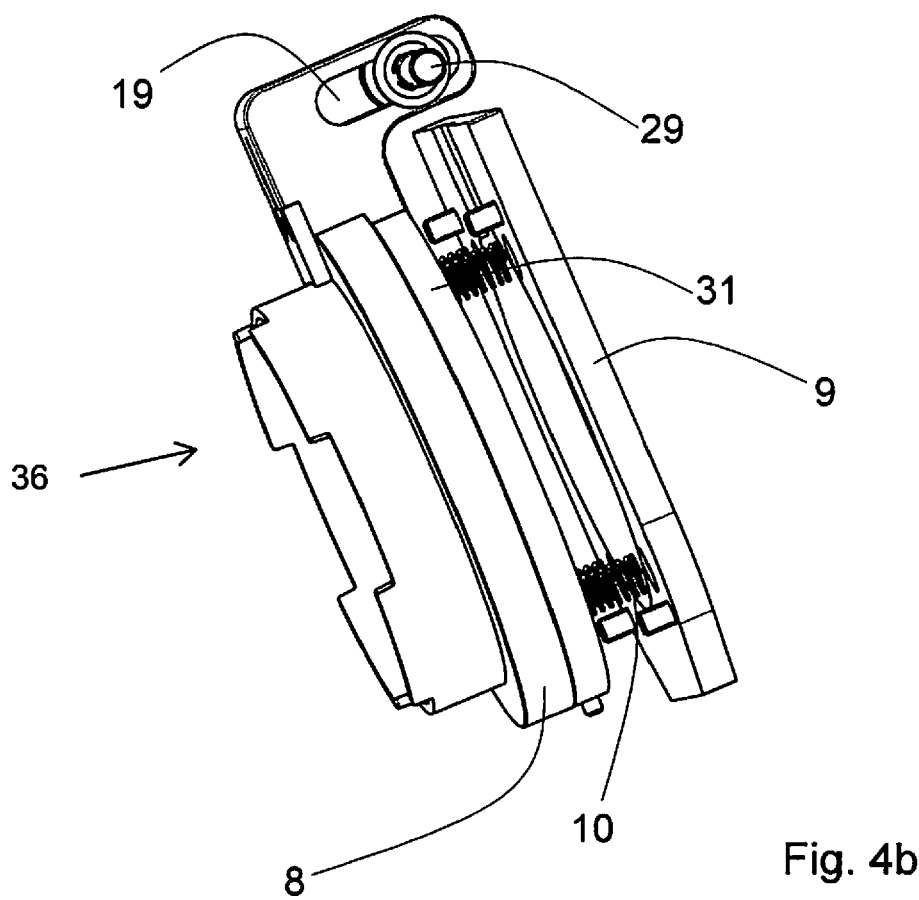
Figure 4C:
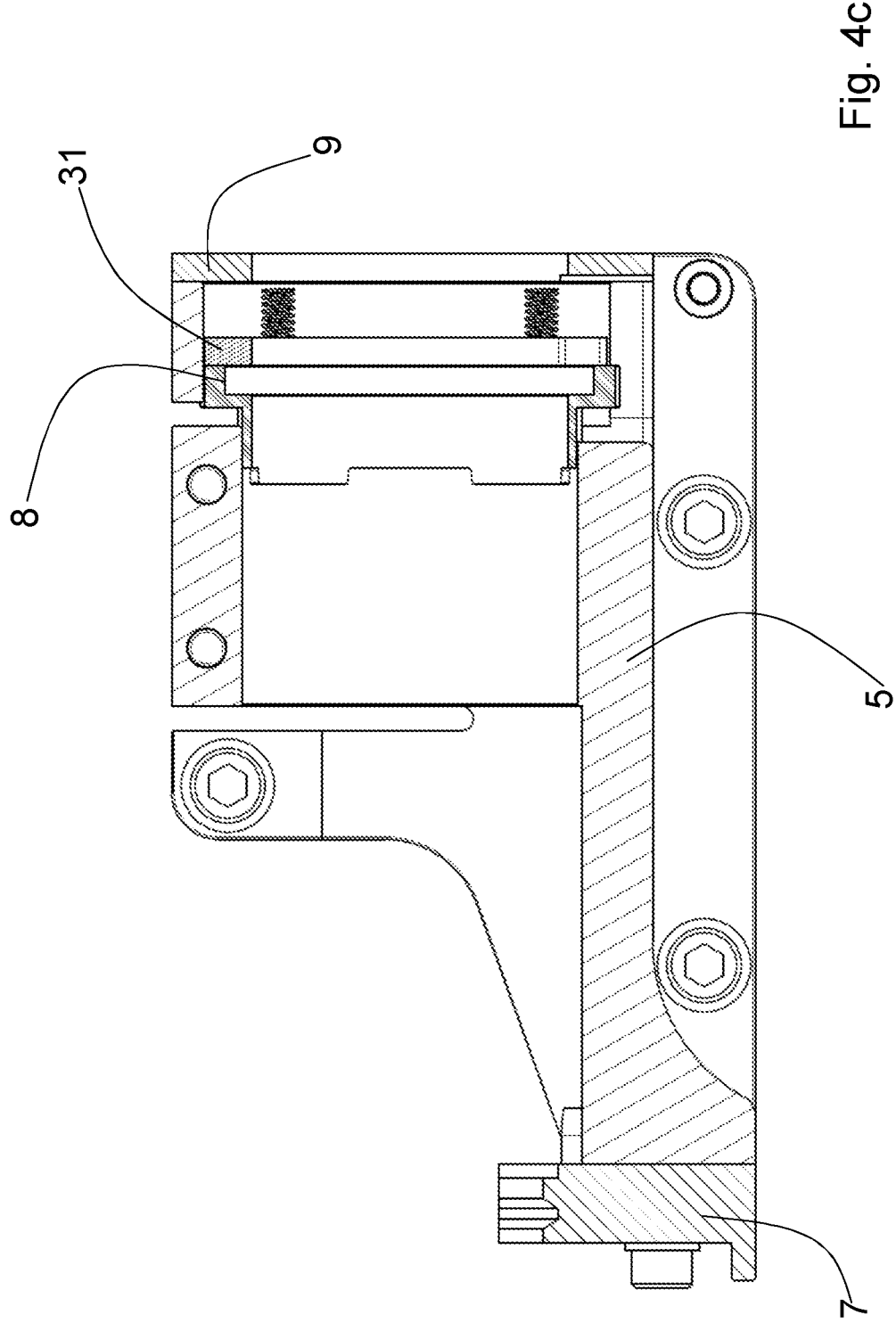
Figure 5:
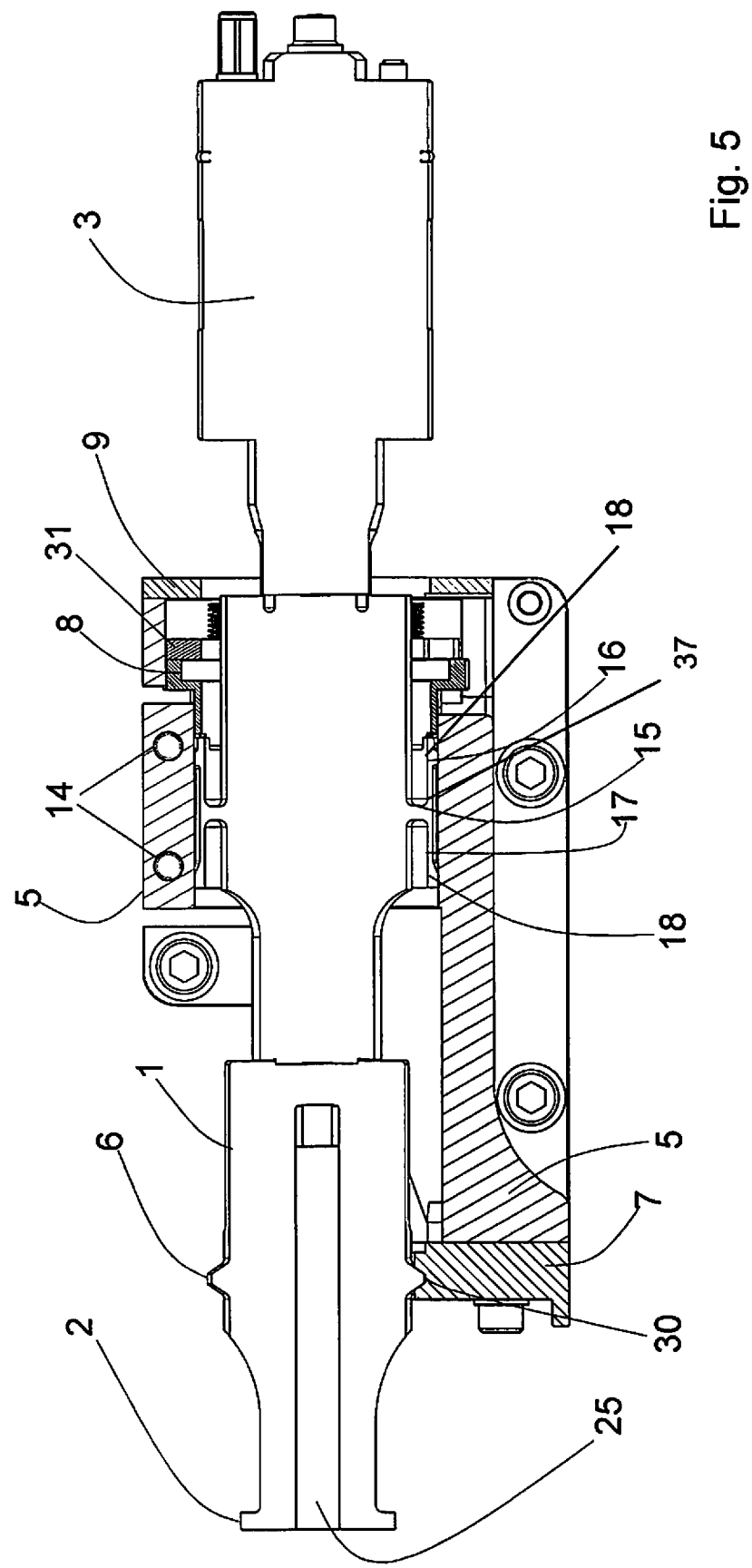
Figure 6:
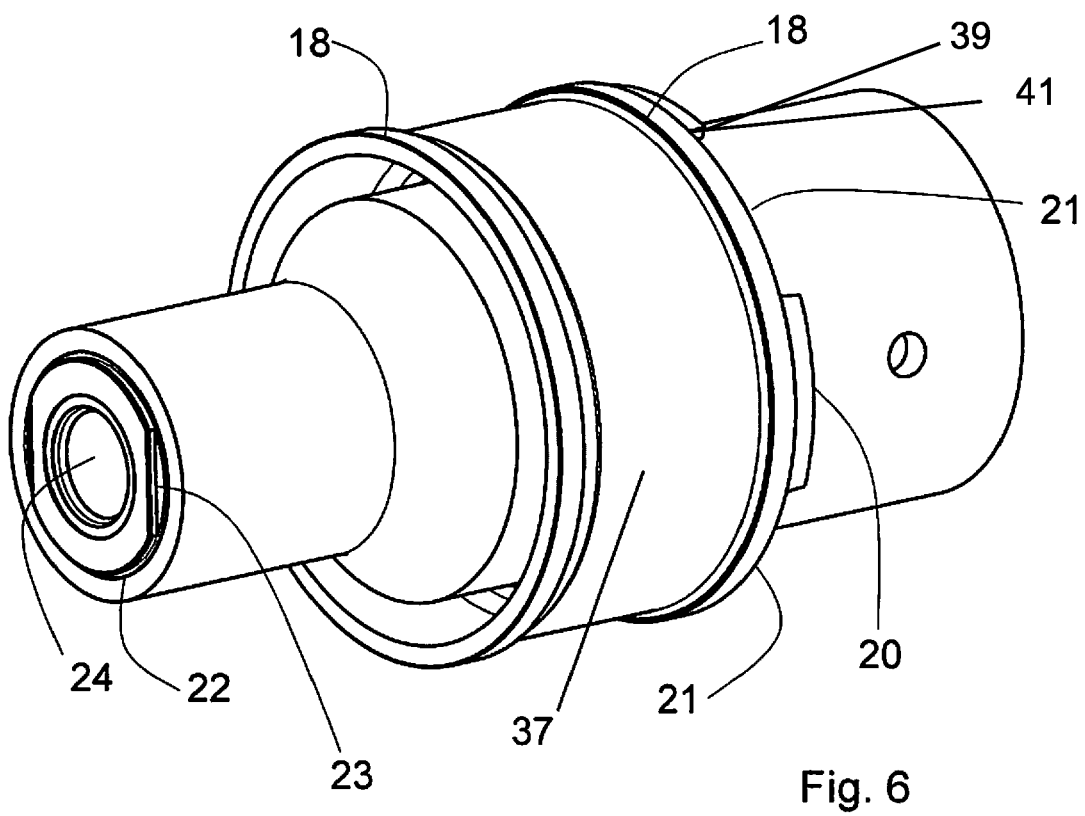
Figure 7:
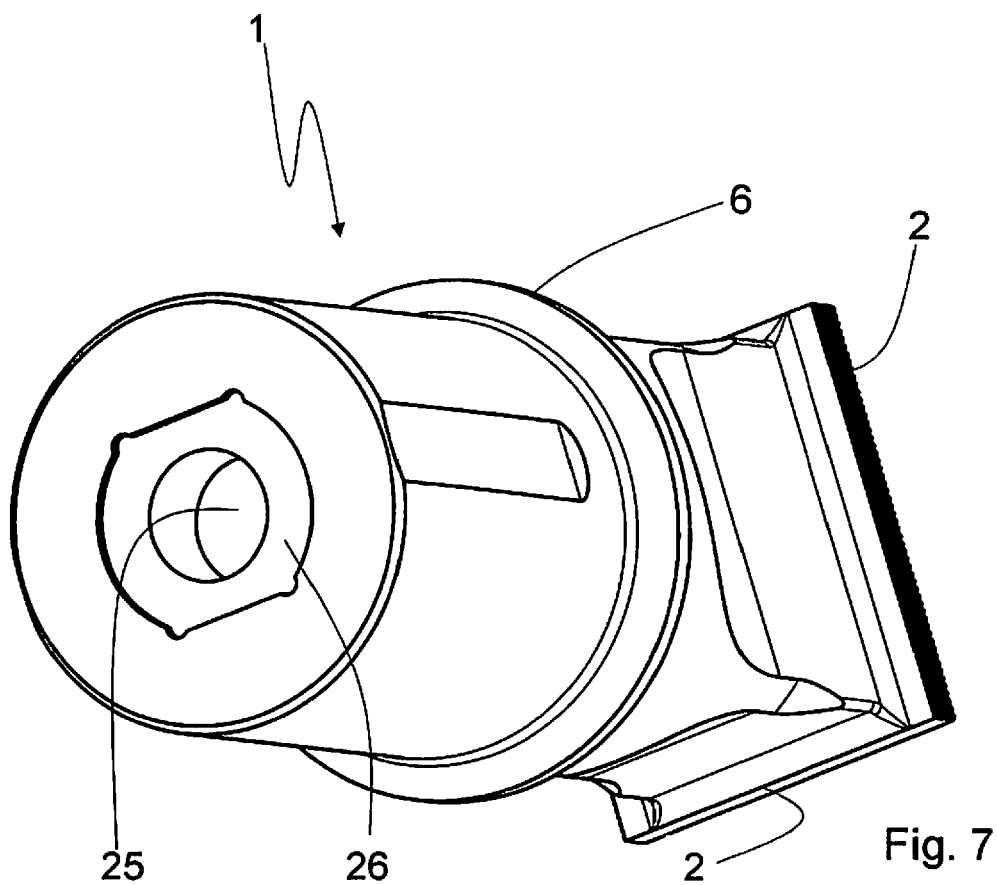

Further advantages, features and possible uses of the present invention will be apparent from the description hereinafter of a preferred embodiment of the invention and the associated Figures in which:

FIG. 1 shows a plan view of an ultrasonic welding installation according to the invention, FIG. 2 shows a perspective view of the ultrasonic welding installation of FIG. 1 without a holder, FIG. 3 shows a perspective view of the holder of FIG. 1 without the vibration structure, FIGS. 4a, 4b, 4c, 4d show a perspective view of the coupling element of the angle positioning element of FIG. 1 and a sectional view of the angle positioning element and the holder, FIG. 5 shows a sectional view through the FIG. 1 embodiment, FIG. 6 shows a perspective view of the amplitude transformer of FIG. 1, and FIG. 7 shows a perspective view of the sonotrode of FIG. 1.

FIG. 1 shows a first embodiment of the ultrasonic welding installation according to the invention. This ultrasonic welding installation is intended specifically for welding metal. It has an ultrasonic vibration unit including a sonotrode 1, an amplitude transformer 4 and a converter 3. The elements of the ultrasonic vibration unit are arranged in mutually juxtaposed relationship along a longitudinal axis. The converter 3 converts an electrical ac voltage into a mechanical ultrasonic vibration. That mechanical vibration is changed in its amplitude but not in its frequency by means of the amplitude transformer 4 and transmitted to the sonotrode 1. On the side of the sonotrode 1, opposite the converter 3, it has altogether four sealing surfaces 2 provided to come into contact with the material to be processed. The ultrasonic vibration unit with its individual elements, that is to say the converter 3, the amplitude transformer 4 and the sonotrode 1, are matched to each other in such a way that they can be set in resonance with an ultrasonic frequency of the wavelength. Within the sonotrode a standing longitudinal half-wave is then formed. The ultrasonic vibration unit has to be held in a machine support stand. The holder 5 is provided for that purpose, being described in detail hereinafter.

FIG. 2 shows a perspective view of the FIG. 1 embodiment. It will be seen here that the individual parts of the ultrasonic vibration unit, namely the converter 3, the amplitude transformer 4 and the sonotrode 1 are substantially rotationally symmetrical, wherein only the end of the sonotrode 1, that is remote from the converter 3, is of a square configuration with a welding surface 2 provided at each edge surface of the square cross-section. Alternatively the sonotrode could also be of other cross-sections like for example triangular, rectangular but not square, and so forth.

Particularly when welding metals and more specifically in particular non-ferrous metals like for example copper or aluminium by means of ultrasound the welding surface suffers from considerable wear so that the ultrasonic welding installation has to be partially or completely replaced at regular intervals.

As the illustrated sonotrode has a total of four sealing surfaces 2 it can be turned through 90° when a sealing surface 2 is worn and continue to be used in that position.

For processing metal by means of ultrasound the material to be processed is arranged between the sealing surface 2 of the sonotrode 1 and a counterpart tool 35 and then the ultrasonic vibration unit is caused to vibrate so that an ultrasonic vibration can be transmitted into the material to be processed by way of the sealing surfaces 2.

The holder 5 in FIG. 1 is shown separately in FIG. 3. It is in the form of a tightening clamping sleeve. It can be seen (FIG. 1) that the holder 5 completely encloses the amplitude transformer 4. Holder 5 does however have a clamping device 40 having a slot 11 formed by two limb elements 12, 13. In the position shown in FIG. 3 the amplitude transformer 4 can be pushed axially into the holder 5. In that position the amplitude transformer 4 and therewith the entire ultrasonic vibration unit can be rotated within the holder 5 about its longitudinal axis. As soon as the desired position of the ultrasonic vibration unit or the sealing surfaces 2 of the sonotrode 1 is reached the two limb elements 12, 13 can be moved towards each other by means of screws which are accommodated in the bores 14 provided within the limb element 13 in the form of a threaded bore and within the limb element 12 in the form of a through bore so that the inside diameter of the sleeve-like holder 5 is reduced and the amplitude transformer 4 is clamped fast in the holder 5 and relative rotation of the ultrasonic vibration unit about its longitudinal axis with respect to the holder 5 is then no longer possible. In the illustrated embodiment the limb elements 12, 13 have corresponding slot walls which serve as abutment surfaces. That means that the portion of the outer surface of the ultrasonic vibration unit and the inner surface of the tightening sleeve are such that the limb elements 12, 13 can be moved towards each other by means of screws which engage into the bores 14 until the abutment surfaces are in contact with each other and in that situation the ultrasonic vibration unit is held fixedly within the tightening sleeve. That configuration ensures that the tightening sleeve cannot exert an excessively great pressure on the delicate ultrasonic vibration unit. It is therefore not possible for higher forces to be exerted on the ultrasonic vibration unit than that which the sleeve applies to the ultrasonic vibration unit at the time at which the two slot walls of the limb elements 12, 13 meet.

FIG. 4a shows a perspective view of the coupling element 8 of the angle positioning device 36. The angle positioning device 36 serves to set the angular position of the sealing surfaces 2 of the sonotrode as precisely as possible in a simple fashion.

The angle positioning device 36 has the coupling element 8 which is in the form of a sleeve. At its side remote from the converter there is a row of projections 27 and recesses 28.

As can be seen in particular from FIG. 5 the amplitude transformer has an outer bead 37 which here is formed by a leg 15 and a flange having a first and a second sleeve portion 16, 17. The leg 15 is connected to the amplitude transformer 4 at a vibration node. From the amplitude transformer 4 at the end of the leg 15 the first sleeve portion 16 extends in the direction of the converter 3 and the second sleeve portion 17 extends in the direction of the sonotrode 1. Both the first sleeve portion 16 and also the second sleeve portion 17 have a peripheral collar 18 and holding points 41, which serve to contact the holder 5. That kind of fixing allows a holding action without involving noteworthy influence on the vibration behaviour of the ultrasonic vibration unit.

FIG. 6 shows a perspective view of the amplitude transformer 4. The two peripheral collars 18 can be seen there. The first sleeve portion 16 has a row of projections 20 and recesses 21 which correspond to the projections 27 and the recesses 28 of the angle positioning device 36. The projections 27 and the recesses 28 of the angle positioning device 36 can thus be connected to the recesses 21 and the projections 20. That positively locking connection prevents rotation of the ultrasonic vibration unit about the longitudinal axis while a relative movement between the ultrasonic vibration unit and the angle positioning device 36 in the direction of the longitudinal axis is not prevented.

FIG. 4b shows the entire rotary positioning device. The coupling element 8 already shown in FIG. 4a bears against a pressure plate 31 which in turn is arranged resiliently on the fixing element 9 by means of the springs 10. The fixing element 9 is arranged stationarily. By virtue of the springs 10 the pressure plate can be moved in the axial direction relative to the fixing element 9. As the coupling element 8 bears against the pressure plate 31 the coupling element moves in the axial direction together with the pressure plate 31. The coupling element can be rotated to and fro relative to the pressure plate 31 between two positions about the longitudinal axis, as is described hereinafter.

FIG. 4c shows a sectional view of the holder 5 together with the rotary positioning device.

As also shown in FIG. 2 spring elements 10 press the coupling element 8 forwardly, that is to say in the direction of the sonotrode 1, and thus into engagement with the projections 20 and recesses 21 of the amplitude transformer 4.

As long as the holder 5 is not yet in its clamped position the ultrasonic vibration unit can be rotated about its longitudinal axis, by the coupling element 8 being urged rearwardly, that is to say in the direction of the converter 3, by means of the ultrasonic vibration unit, against the force of the springs 10. The ultrasonic vibration unit can then be rotated about its longitudinal axis until the projections 20 come to lie in the recesses 28. The coupling element 8 therefore latches into the flange of the amplitude transformer 4.

In the illustrated embodiment the number of projections 20 and 27 and the number of recesses 21 and 28 corresponds to the number of sealing surfaces 2 on the sonotrode 1. This therefore ensures that the ultrasonic vibration unit can only be fitted in selected angle positions.

In the illustrated embodiment a small relative rotation of the coupling element 8 is additionally possible relative to the fixing element 9 about the longitudinal axis. To implement such a slight rotary movement there is provided an adjusting element which is in the form of an eye 19 and is releasably connected to the coupling element 8. A fine adjustment device in the form of a screw 29 connects the adjusting element to the holder 5. Therefore, by rotating the screw 29 the coupling element 8 connected to the adjusting element can be rotated to a certain extent with respect to the holder 5 and the fixing element 19 to effect fine adjustment of the angle position. Therefore, the screw 29 has some play within the slot provided in the eye 19, both in the axial direction and also in the radial direction.

FIG. 4d shows a further perspective sectional view through the angle positioning device 36. The eye 19 has a threaded bore into which a grub screw 32 engages. The eye 19 can be clamped to the coupling element 8 by means of the grub screw 32 so that the coupling element 8 and the eye 19 can only be jointly rotated about the longitudinal axis.

In a first adjustment of the ultrasonic vibration unit within the holder or if the angular position of the sealing surfaces with respect to the projections 20 and recesses 21 is not known the grub screw 32 can thus be released and the ultrasonic vibration unit fitted into the holder so that the coupling element 8 is pressed against the force of the springs 10 in the direction of the fixing element 9 and then rotated about its longitudinal axis until the projections 20 and recesses 21 of the ultrasonic vibration unit come to lie in the corresponding projections 27 and recesses 28 of the coupling element 8. In that position the coupling element 8 is urged away from the fixing element 9 again by virtue of the force of the springs 10. The ultrasonic vibration unit can now be rotated about its longitudinal axis until the sealing surfaces 2 are approximately in the desired rotary position. As the grub screw 32 is released the coupling element 8 rotates with the ultrasonic vibration unit while the pressure plate 31 remains in its position.

As soon as the desired rotary position of the ultrasonic vibration unit is approximately reached the grub screw 32 can be tightened to connect the eye 19 to the coupling element 8. Further rotation of the ultrasonic vibration unit about its longitudinal axis is now only still very limitedly possible by rotation of the screw 29.

As can be seen in FIG. 6 the amplitude transformer has a pin 22 at its side towards the sonotrode 1. FIG. 7 shows a perspective view of the sonotrode 1. At its side towards the amplitude transformer 4 the sonotrode 1 has an opening 26 corresponding to the pin 22. The pin 22 has cut-outs 23 which can also be seen in the corresponding opening 26. When the pin 22 is fitted into the opening 26 that provides a positively locking connection between the sonotrode 1 and the amplitude transformer 4 in terms of a direction of rotation about the longitudinal axis.

The sonotrode 1 has a central bore 25 which is in the form of a stepped bore and through which a screw can be passed into a corresponding central threaded bore 24 in the amplitude transformer to fix the sonotrode 1 to the amplitude transformer 4.

As can be seen from the sectional view in FIG. 5 the sonotrode 1 has an outer rib 6 which is arranged at a vibration node of the resonance frequency of the sonotrode 1. The outer rib is of a peripherally extending configuration in the illustrated embodiment. Fixed to the holder 5 is a support element which is movable in the radial direction between an outer position in which the ultrasonic vibration unit can be received in the holder and an inner position in which the support element prevents a movement of the ultrasonic vibration unit in the direction of the longitudinal axis. The support element can be arrested in that position to prevent unwanted movement of the support element 7 in the direction of the outer position. The support element 7 has a groove 30 in which the outer rib 6 comes to lie. If now a force is exerted on the sonotrode from above as in FIG. 5 by the material to be processed that force is carried by the support element 7. The provided enclosing holder 5 on the amplitude transformer 4 is relatively far away from the machining location, that is to say the sealing surfaces 4, so that already slight welding forces on the sealing surface 2 would result in flexing of the ultrasonic vibration unit. The support device 7 is provided for that purpose.

To accommodate the ultrasonic vibration unit in the holder firstly the clamping action by means of the screws in the bores 14 has to be released. In addition the support element 7 has to be displaced radially outwardly. The ultrasonic vibration unit can now be fitted into the holder 5. In that case the coupling element 8 and the pressure plate 31 are urged in the direction of the fixing element 9 against the force of the springs 10 until the outer rib 6 comes to lie in the groove 30 in the support element 7 after it has been moved radially inwardly and arrested. That establishes the axial position of the ultrasonic vibration unit. Angle positioning is then effected by the ultrasonic vibration unit being rotated about its longitudinal axis until the projections of the coupling element 8 latch into the corresponding openings on the first sleeve portion 16. The angle position is then also nearly perfectly oriented in that position. Fine adjustment is effected by means of the fine adjustment device, that is to say the eye 19 and the screws 29, by means of which fine adjustment of the angular position can be effected.

As soon as the correct position of the ultrasonic vibration unit is reached the limb elements 12 and 13 can be moved towards each other by means of the fixing screws which engage into the bores 14 in order to reduce the slot 11 and clampingly embrace the ultrasonic vibration unit in the holding sleeve.

LIST OF REFERENCES 1 sonotrode
2 sealing surface
3 converter
4 amplitude transformer
5 holder
6 outer rib
7 support element
8 coupling element
9 fixing element
10 springs
11 slot
12 limb element
13 limb element
14 bore
15 leg
16 first sleeve portion
17 second sleeve portion
18 collar
19 eye
20 projection
21 recess
22 pin
23 cut-out
24 central bore
25 central bore
26 opening
27 projection
28 recess
29 screw
30 groove
31 pressure plate
32 grub screw
33 slot wall
34 slot wall
35 counterpart tool
36 angle positioning device 37 outer bead
38 contact surface
39 contact surface
40 clamping device
41 holding points

The invention claimed is:

1. An ultrasonic welding installation comprising an ultrasonic vibration unit having a sonotrode and a converter,
wherein the sonotrode (1) and the converter (3) are arranged in mutually adjacent relationship along a longitudinal axis having a direction and the ultrasonic vibration unit can be caused to resonate with an ultrasonic vibration in the direction of the longitudinal axis with a wavelength $\lambda/2$,
wherein there is provided a holder (5) for holding the ultrasonic vibration unit, characterised in that the holder (5) has an angle positioning device,
wherein the angle positioning device and the ultrasonic vibration unit are of such a configuration that they can be connected together in a positively locking relationship so that rotation of the ultrasonic vibration unit about the longitudinal axis is prevented by the positively locking connection and a relative movement between the ultrasonic vibration unit and the holder in the direction of the longitudinal axis is not prevented, and
wherein the ultrasonic vibration unit has an outer bead (37) with at least one recess (21), wherein the angle positioning device has at least one projection (27) which corresponds to the at least one recess (21) and which can engage into the at least one recess (21) and thus provide the positive locking connection.

2. The ultrasonic welding installation according to claim 1 characterised in that the outer bead has a plurality of recesses (21).

3. The ultrasonic welding installation according to claim 1 characterised in that the at least one projection (27) of the angle positioning device extends in the direction of the longitudinal axis.

4. The ultrasonic welding installation according to claim 1 characterised in that the at least one recess (21) of the outer bead (37) and the at least one projection (27) of the angle positioning device have mutually corresponding contact surfaces (38, 39) which when the ultrasonic vibration unit is fitted into the angle positioning device come into contact with each other upon rotation of the ultrasonic vibration unit about the longitudinal axis.

5. The ultrasonic welding installation according to claim 1 characterised in that the angle positioning device has a fixing element (9) for fixing the angle positioning device to a machine stand and has a coupling element (8) which is reciprocable between two positions in the direction of the longitudinal axis relative to the fixing element (9), wherein the positively locking connection can be produced between the coupling element (8) and the ultrasonic vibration unit.

6. The ultrasonic welding installation according to claim 5 characterised in that the coupling element (8) is elastically prestressed into one of the two positions.

7. The ultrasonic welding installation according to claim 5 characterised in that there is provided a fine adjustment device which is connected to the coupling element (8).

8. The ultrasonic welding installation according to claim 1 characterised in that the outer bead is arranged on the sonotrode (1) or an amplitude transformer (4) arranged between the sonotrode (1) and the converter (3).

9. The ultrasonic welding installation according to claim 1 characterised in that there is provided a support element (7) for supporting a force applied to the sonotrode (1) perpendicularly to the longitudinal axis, wherein the sonotrode (1) and the support element (7) have mutually corresponding support surfaces which, when the force is applied to the sonotrode (1) perpendicularly to the longitudinal axis, come into contact with each other,
wherein the corresponding support surfaces are of such a configuration that when they are in contact with each other they prevent a relative movement of the sonotrode (1) with respect to the support element (7) in the direction of the longitudinal axis and allow rotation of the sonotrode (1) about the longitudinal axis.

10. The ultrasonic welding installation according to claim 9 characterised in that either the sonotrode (1) has a rib (6) and the support element has a groove or the sonotrode (1) has a groove and the support element has a rib, the rib and the groove having the corresponding support surfaces.

11. The ultrasonic welding installation according to claim 9 characterised in that there is provided a counterpart tool, wherein the sonotrode (1) and the counterpart tool are moveable relative to each other in a direction perpendicular to the longitudinal axis and the support element (7) is so positioned that a force exerted on the sonotrode (1) by way of a material positioned between the sonotrode (1) and the counterpart tool is transmitted to the support element.

12. The ultrasonic welding installation according to claim 1 characterised in that there is provided an amplitude transformer (4) arranged between the sonotrode (1) and the converter (3), wherein the amplitude transformer (4) is connected to the converter (3) and/or the sonotrode (1) by way of the positively locking connection which provides a positive locking relationship in all directions of the plane perpendicular to the longitudinal axis.

13. The ultrasonic welding installation according to claim 12 characterised in that the positively locking connection between the amplitude transformer (4) and the converter (3) or between the amplitude transformer (4) and the sonotrode (1) comprises a pin and a corresponding opening (26).

14. The ultrasonic welding installation according to claim 13 characterised in that the pin (22) and the corresponding opening (26) are not of a rotationally symmetrical configuration relative to the longitudinal axis,
wherein the pin (22) and the corresponding opening (26) are of a rotary symmetrical configuration about the longitudinal axis with an n-fold axis of rotation, wherein n is a natural number greater than one.

15. The ultrasonic welding installation according to claim 1 characterised in that the holder (5) has a clamping device (40) reciprocable between an opened position in which the ultrasonic vibration unit can be removed from the holder (5) and a closed position in which the clamping device comes into contact with the ultrasonic vibration unit at at least two holding points (41) and exerts a force on the ultrasonic vibration unit so that the ultrasonic vibration unit is held.

16. The ultrasonic welding installation according to claim 15 characterised in that the at least two holding points are arranged on the outer bead (37) of the ultrasonic vibration unit.

17. The ultrasonic welding installation according to claim 2 wherein the angle positioning device has a plurality of the projections (27) corresponding to the plurality of recesses (21).

18. The ultrasonic welding installation according to claim 17 wherein the ultrasonic vibration unit can be connected in the positively locking relationship to the angle positioning device in a plurality of positions rotated relative to each other about the longitudinal axis.

* * * * *